United States Patent [19]
Kishi

[11] Patent Number: 5,152,074
[45] Date of Patent: Oct. 6, 1992

[54] RAW SEWAGE DRYING APPARATUS

[75] Inventor: Mitsuhiro Kishi, Tochigi, Japan

[73] Assignee: Kabushiki Kaisha Japanic, Ashikaga, Japan

[21] Appl. No.: 575,910

[22] Filed: Aug. 29, 1990

[30] Foreign Application Priority Data

Sep. 28, 1989 [JP] Japan .................. 1-253469
Dec. 1, 1989 [JP] Japan .................. 1-312536

[51] Int. Cl.⁵ .................................................. F26B 3/34
[52] U.S. Cl. ...................................... 34/1 B; 4/111.1; 219/10.491
[58] Field of Search ............... 4/449, 111.1, 111.5, 4/111.6; 34/179, 181, 60, 1, 71; 219/6.5, 8.5, 10.491

[56] References Cited
U.S. PATENT DOCUMENTS

4,999,930 3/1991 Kishi et al. ..................... 34/95

Primary Examiner—Henry A. Bennet
Attorney, Agent, or Firm—Flynn, Thiel, Boutell & Tanis

[57] ABSTRACT

A raw sewage drying apparatus having a first air tight casing, a rotatable drive shaft unit provided in the first casing, a stirring structure fixed to the drive shaft unit and having a plurality of blades for stirring raw sewage stored in the first casing, a plurality of elements such as balls contained in the first casing, the elements being heated by an electromagnetic wave, and a heating device provided outside the first casing for radiating an electromagnetic wave toward the first casing.

20 Claims, 7 Drawing Sheets

RAW SEWAGE DRYING APPARATUS

FIELD OF THE INVENTION

The present invention relates to a raw sewage drying apparatus for disposing of raw sewage, which apparatus can be utilized outdoors, in a transportation means such as a vessel or train, or in a tunnel through which a tank truck used for collecting raw sewage (hereafter referred to simply as a vacuum truck) can not go.

BACKGROUND OF THE INVENTION

The raw sewage discharged from the human body is typically discharged to a sewage system by use of a flush toilet and the like in an ordinary house or is discharged into a river after being temporarily stored in a holding tank and purified therein. However, at events such as festivals, athletic events, fairs, meetings and the like, temporary toilet facilities must be provided to dispose of the raw sewage.

Employed conventionally are movable temporary toilets, most of which have a tank for temporarily accommodating raw sewage therein. However, the temporary toilet has a problem in that the raw sewage stored in the tank is sucked into a vacuum truck for collection, which is laborious and time consuming for maintenance thereof after use of them.

Transportation vehicles such as buses, trains, vessels, etc. which operate over long distances are provided with an exclusive tank for storing and holding the discharged raw sewage. The raw sewage in this tank is subjected to a deodorizing treatment by chemicals, and thereafter collected by a vacuum truck.

In facilities of the above type, the raw sewage is stored in the state as discharged from the human body, and thereafter collected so that disposal of the raw sewage is unhygienic. Also, a long period of use of the tank creates sewage residue on the tank which causes a bad smell which is disliked by an operator. Thus, such temporary sewage facilities are not preferable in modern times.

In an attempt to improve on the above, there have been proposed several hygienic proposal methods. In one method, for example, chemicals are introduced into the tank where the raw sewage is stored to thereby prevent the bad smell and effect a sterilization. This is mainly employed in the transportation industry such as on trains like the Shinkansen Express in Japan. This method, however, cannot be used for a long period of time because the chemicals become diluted, and costs are high.

In another method the raw sewage is sorted in a bag made of vinyl and the like to prevent the diffusion of the bad smell. This method however requires a vinyl bag of large size and involves high cost for disposal thereof, and is troublesome in separating the raw sewage from the bag.

In still another method the discharged raw sewage is directly dried by use of heat from a burner, etc. Since the primary component of raw sewage is liquid, it requires a large amount of heat energy to remove the liquid and it takes a long time to effect disposal of the raw sewage.

In view of the drawbacks of the conventional methods of disposing of the raw sewage, the present inventor proposed a drying apparatus having a casing provided with stirring blades and heating bodies therein in which the raw sewage is stirred by the rotation of the stirring blades and heated by heat generated by the heating bodies whereby the raw sewage is dried in a short period of time as disclosed in Japanese Patent Laid-Open Publication Nos. 63-124150, 63-172852, 63-190857, 63-292789 and Application No. 63-198858. However, according to the proposed disposing methods, an outer periphery of the casing storing the raw sewage is heated by the heat generated by the burner or the heat converted from electricity by a heater. Hence, the metal casing storing the raw sewage is first heated which entails inferior thermal efficiency.

Inasmuch as the conventional method is inferior in thermal efficiency, the direct heating of the raw sewage is superior in thermal efficiency. Hence, it is desired to proposed a disposing apparatus capable of heating the raw sewage by applying direct heat energy to the sewage.

It is an object of the present invention to provide a raw sewage drying apparatus capable of directly heating the raw sewage by applying a microwave to the liquid or materials to be heated, and hence the efficiency of heating the raw sewage is improved remarkably.

It is also an object of the present invention to provide a raw sewage drying apparatus capable of hygienically heating the raw sewage even if the raw sewage apparatus is installed in vehicles, vessels, etc.

It is a further object of the present invention to provide a raw sewage drying apparatus capable of heating the raw sewage by applying magnetic flux generated by high frequency or microwave generated by magnetron to the liquid, and the thickness of the casing is reduced to reduce the cost for manufacturing thereof.

SUMMARY OF THE INVENTION

The present invention provides a raw sewage drying apparatus comprising a first air tight casing, a rotatable drive shaft unit provided in the first casing, a stirring means fixed to the drive shaft unit and having a plurality of blades for stirring raw sewage stored in the first casing, a plurality of elements contained in the first casing, said elements being heated by an electromagnetic wave, and a heating means provided outside the first casing for radiating an electromagnetic wave toward the first casing.

The above and other objects, features and advantages of the present invention will become apparent from the following description taken in conjunction with the accompanying drawings.

DETAILED DESCRIPTION

First Embodiment (FIGS. 1 to 4)

Figure 1:
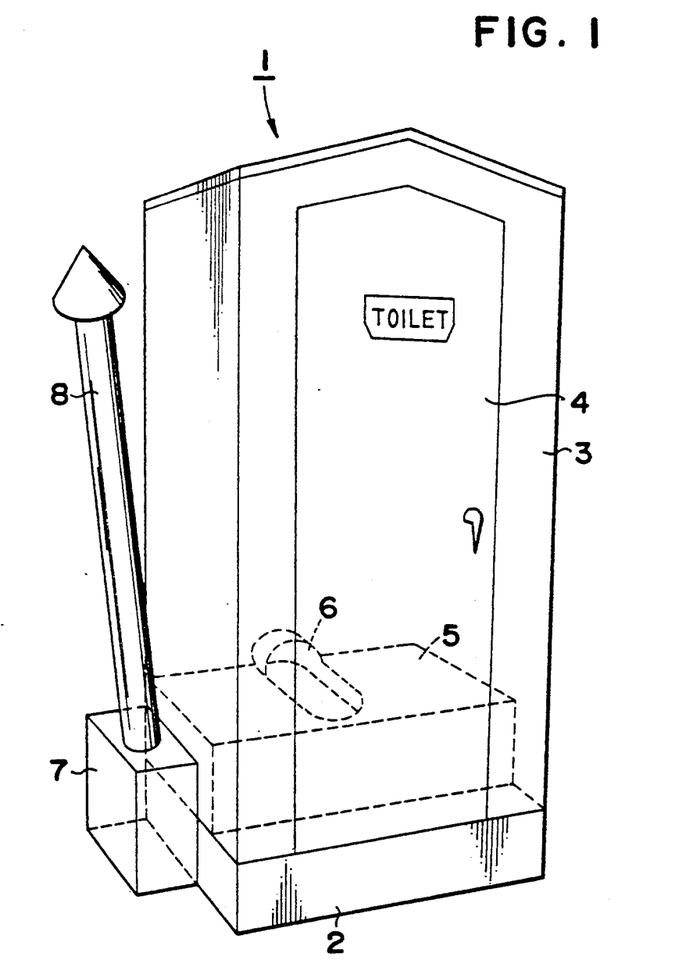
FIG. 1 is a perspective view of a temporary (i.e. portable) toilet employing a raw sewage drying apparatus according to first and second embodiments of the present invention.

A raw sewage drying apparatus according to a first embodiment of the present invention will be described with references to FIGS. 1-4. Described in the first embodiment is a temporary toilet incorporating a raw sewage drying apparatus movable by a truck or the like. In FIG. 1, the temporary toilet 1 is made of reinforced synthetic resin plastic and has a box shape. The toilet 1 has a base 2 which can be supported on a surface of the earth and which has a roofed house 3 fixed thereto. A door 4 is attached to a front portion of the house 3. The temporary toilet 1 has inside thereof a drying apparatus 5 which is fixed to an upper portion of the base 2. A stool 6 is fixed to an upper portion of the drying apparatus 5 for receiving the raw sewage. The base 2 has a dust collection unit 7 at the side thereof which is provided with a diffusion pipe 8 at the upper portion thereof for exhaling liquid (i.e. vapor) from the raw sewage to the atmosphere.

Figure 2:
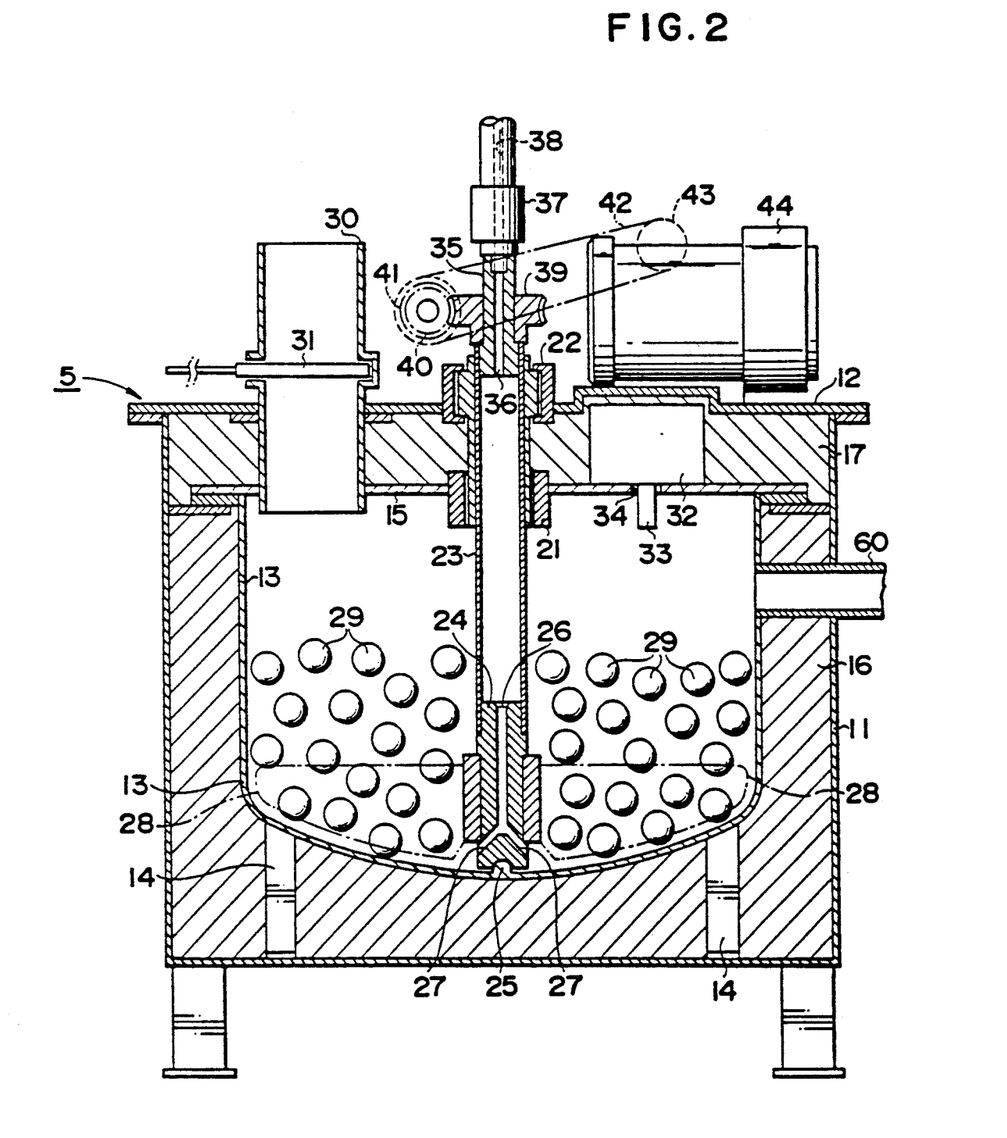
FIG. 2 is a vertical cross sectional elevational view of a drying apparatus, a constituent of the raw sewage apparatus, according to a first embodiment of the invention.

The raw sewage drying apparatus 5 according to the first embodiment, as shown in FIG. 2, comprises an airtight first or inner casing 13, a rotatable drive shaft unit 23 provided in the first casing 13, a stirring means 28 fixed to the drive shaft unit 23 and having a plurality of blades for stirring raw sewage stored in the first casing 13, a plurality of elements 29 to be heated (hereinafter referred to as balls) contained in the first casing 13, said balls 29 being heated by an electromagnetic wave, and a heating means 32 provided outside the first casing 13 for radiating an electromagnetic wave toward the first casing 13.

Figure 3:
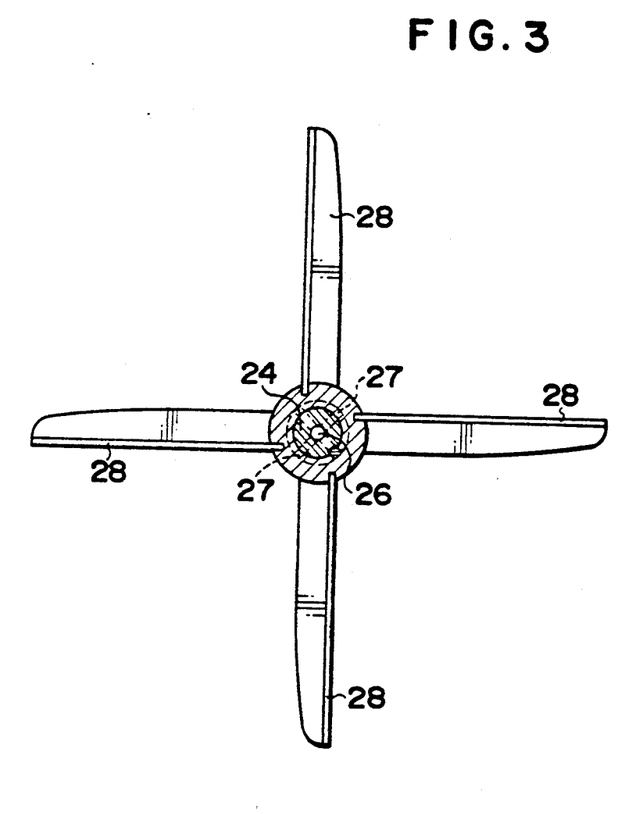
FIG. 3 is a plan view of stirring blades, constituents of the drying apparatus, according to the first and the second embodiments of the present invention.

The raw sewage drying apparatus 5 also comprises an outer casing 11 made of thin steel plate of a cubic shape open at the upper portion thereof, an outer cover 12 fixed to a top peripheral surface of the outer casing 11, the inner casing 13 having a semispherical curved lower portion and an open upper portion, an inner cover 15 fixed to a top peripheral surface of the inner casing 13, a heat insulating material 17 made of glass, wool, etc., interposed between the outer cover 12 and the inner cover 15 a heat insulating material 16 of glass, wool, etc., interposed in the space 10 between the outer casing 11 and the inner casing 13, legs 14 fixed to the bottom of casing 13 and interposed between the lower portion of the inner casing 13 and the bottom of the outer casing 11 for supporting the inner casing 13, the magnetron 32 fixed to the inner cover 15 thereover for generating a microwave power (hereinafter referred to as microwave), an antenna 33 protruded from the magnetron 32 directed downward through a through hole 34 provided on the inner cover 15 for radiating the microwave toward dielectric elements or balls 29, described later, bearings 21, 22 respectively fixed to the central portions of the outer cover 12 and the inner cover 15, the hollow drive pipe 23 rotatably mounted coaxially on the bearings 21, 22 and penetrating vertically inside the outer casing 11 and the inner casing 13 substantially along the central vertical axis thereof, a lower metal shaft piece 24 fixed to the lower portion of the drive pipe 23 and having a concave recess in the lower end thereof for receiving therein a projection 25 protruding upwardly from the bottom of the inner casing 13 for rotatably supporting the lower end of the drive pipe 23, a vent passage 26 extending axially of the lower metal shaft piece 24 and branched at the lower portion thereof to define communication holes 27 for communicating with the inside space of the inner casing 13, four radially-projecting stirring blades 28 fixed to the lower metal piece 24 at 90° angular intervals as shown in FIG. 3 and positioned close to the curved bottom of the inner casing 13, an upper metal shaft piece 35 coaxially fixed to the upper portion of the drive pipe 23 and projecting upwardly above the outer cover 12, vent passage 36 vertically penetrating the upper metal shaft piece 35, a worm gear 39 fixed to the upper metal shaft piece 35, a worm 41 engaged with the worm gear 39, a sprocket wheel 40 fixed to the worm 41, a sprocket wheel 43 fixed to a motor 44 mounted on the outer cover 12, a chain 42 entrained around the sprocket wheels 40 and 43 for transmitting the output of the motor to the worm 41, the plurality of dielectric elements such as balls 29 made of ceramic such as alumina or metal contained in the inner casing 13, an introduction pipe 30 vertically penetrating the covers 12 and 15 for communicating between the stool 6 and the inner casing 13 so that the raw sewage is introduced from the stool 6 to the inner casing 13, and a shutter or valve 31 provided within the introduction pipe 30 for preventing the bad smell from exhausting and the hot air from flowing back toward the stool 6.

Figure 4:
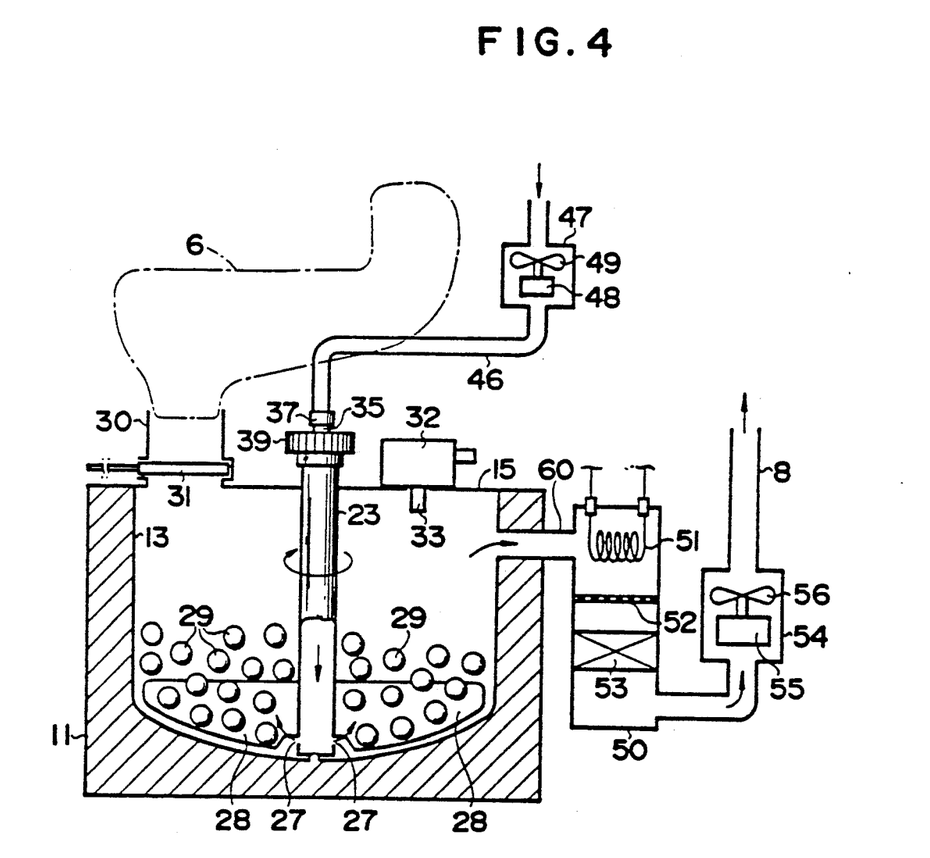
FIG. 4 is a view for explaining the connection between the raw sewage drying apparatus and peripheral apparatus according to the first embodiment.

The raw sewage drying apparatus is connected to peripheral devices as illustrated in FIG. 4.

A sleeve 37 fixed to the upper metal piece 35 is connected to a blower pipe 46 which is connected to a blower 47 for introducing the fresh air. The blower 47 comprises a motor 48 and a fan 49 driven by the motor 48.

A discharge duct 60 is provided at the upper side surface of the inner casing 13 by penetrating the inner casing 11 which communicates with the atmosphere via the diffusion pipe 8.

The duct 60 is connected to a dust collector 50, which collector 50 has therein a reheating electric heater 51 at the upper portion thereof and a filter 52 at the middle portion thereof and a catalyst 53 made of platinum etc. fixed to the lower portion thereof. The output of the dust collector 50 is connected to a blower 54 which comprises a motor 55 and a fan 56 driven by the motor 55 and connects to the diffusion pipe 8 so that the air and the vapor passes through the blower 54 into the diffusion pipe 8.

The operation of the raw sewage drying apparatus according to the first embodiment of the present invention will be described herewith.

The user enters the temporary toilet 1 and discharges the raw sewage into the stool 6. The discharged raw sewage drops via the introduction pipe 30 into the inner casing 13 and is stored therein temporarily. After predetermined numbers of discharging operations are carried out, the inner casing 13 stores the predetermined amount of the raw sewage, which entails a drying operation of the raw sewage.

When the predetermined amount of the raw sewage is stored in the inner casing 13, the shutter 31 closes the introduction pipe 30 to thereby start the drying operation. When the shutter 31 closes the introduction pipe 30, the inner casing 13 is prevented from communicating with the outside. Accordingly, the bad smell exhaled by the raw sewage in the inner casing 13 is prevented from diffusing outside through the stool 6. Furthermore, heat within the inner casing 13 is prevented from being transmitted to the outside through the introduction pipe 30 whereby the thermal efficiency can be improved.

First, the motors 44, 48, 55 are operated respectively. The fan 49 is driven by the motor 48 so that the fresh air flows through the blower pipe 46 and is introduced into the drive pipe 23 through the communication holes 38, 36. The fresh air then flows through vent passage 26 to the communication holes 27 and is discharged at the bottom of the inner casing 13.

Since the motor 55 in the blower 54 is already actuated, the air in the inner casing 13 flows toward the diffusion pipe 8 via the duct 60 and the dust collector 50 having therein the catalyst 53. The air in the inner casing 13 is drawn into the dust collector 50 via the duct 60 and contacts the reheating heater 51 so that the temperature of the saturated vapor is increased and the minute dust etc. is removed by the filter 52 and contacts the catalyst 53. Since the saturated vapor is oxidized by the catalyst 53, the saturated vapor components causing the bad smell such as ammonia, bromine, etc. are oxidized so as to make the air odorless. Inasmuch as the current is applied to the reheating heater 51 at the same time when the motors 44, 48, 55 are operated, when the raw sewage is evaporated in the inner casing 13, the components thereof which generate the bad smell are simultaneously evaporated, but the bad smell can be removed at the time when the vapor is reheated in the dust collector 50 and oxidized by the catalyst 53. The odorless air including the saturated vapor is diffused from the diffusion pipe 8 via the blower 54.

At the same time, the magnetron 32 is operated so that the microwave or electromagnetic wave is radiated from the antenna 33 of the magnetron 32 toward the inner casing 13. The microwave radiated from the antenna 33 is not radiated outside the casings 11 and 13, but is reflected within the inside space of the inner casing 13. Since both the casings 11, 13 are made of metal, the microwave reflected in the inner casing 13 directly heats the raw sewage stored in the inner casing 13 and the dielectric balls 29. Inasmuch as the dielectric balls 29 are made of a material like alumina so as to be induced by the electromagnetic wave for generating heat, the dielectric balls 29 generate heat which is directly transmitted to the raw sewage which directly contacts the balls 29. Hence, liquid which is the primary component of the raw sewage starts to evaporate. The evaporated liquid flows through the discharge duct 60 into the collector 50 and diffused outside through the diffusion pipe 8 via the blower 54.

When the microwave generated by the magnetron 30 heats the raw sewage in the inner casing 13 and the dielectric balls 29, the heated raw sewage is oxidized by oxygen of the air in the inner casing 13 for thereby expediting the speed of oxidation since the air from the outside, namely the fresh air, is always discharged from the communicating holes 27 provided at the lower portion of the drive pipe 23. With repetition of the operation, the liquid component of the collected raw sewage is evaporated and ashes of fiber or paper trash are residual in the inner casing 13. The non-evaporated ashes are rotated by the stirring blades 28 in the inner peripheral surface of the inner casing 13 together with the dielectric balls 29 so that the material other than the liquid component, namely the solid material, is crushed into a minute powder such as ashes. The ashes are blown up by the air discharged by the communication holes 27 and jetted in the discharge duct 60. The ashes which pass through the discharge duct 60 are caught by the filter 52 in the dust collector 50. Hence, the ashes are absorbed by and collected by the filter 52 so that the non-evaporated ashes and the trash residual in the inner casing 13 are cleaned by the air discharged through the communication holes 27 after the liquid component is evaporated. As a result, the drying operation can be effected to a state where no residual matter remains in the inner casing 13.

A series of drying operations is completed upon completion of the evaporation of the liquid component of the raw sewage due to heating of the magnetron 32 and completion of crushing and cleaning of the minute solid material residual due to the operations of the stirring blades 28 and the dielectric heating bodies 29. The inner casing 13 is automatically cleaned and ready for the next disposal of raw sewage.

The raw sewage drying apparatus according to the first embodiment has the following advantages.

Inasmuch as the liquid component which is the main component of the raw sewage is directly heated by the microwave and is evaporated, although the discharged raw sewage has been conventionally drawn and disposed of by a vacuum truck and the like, it is now possible to dispose of the raw sewage by evaporating the liquid component at the temporary facility or on a vehicle such as an automobile or a vessel in a highly hygienic manner.

Inasmuch as the microwave generated by the magnetron can heat the raw sewage as well as the dielectric elements directly contacting the raw sewage, the raw sewage can be directly heated by the microwave so that the thermal efficiency is remarkably increased and the energy loss is reduced compared with conventional heating of the casing.

Second Embodiment (FIGS. 3, 5 to 7)

A raw sewage drying apparatus according to the second embodiment of the present invention will be described with reference to FIGS. 3 and 5 to 7.

Figure 5:
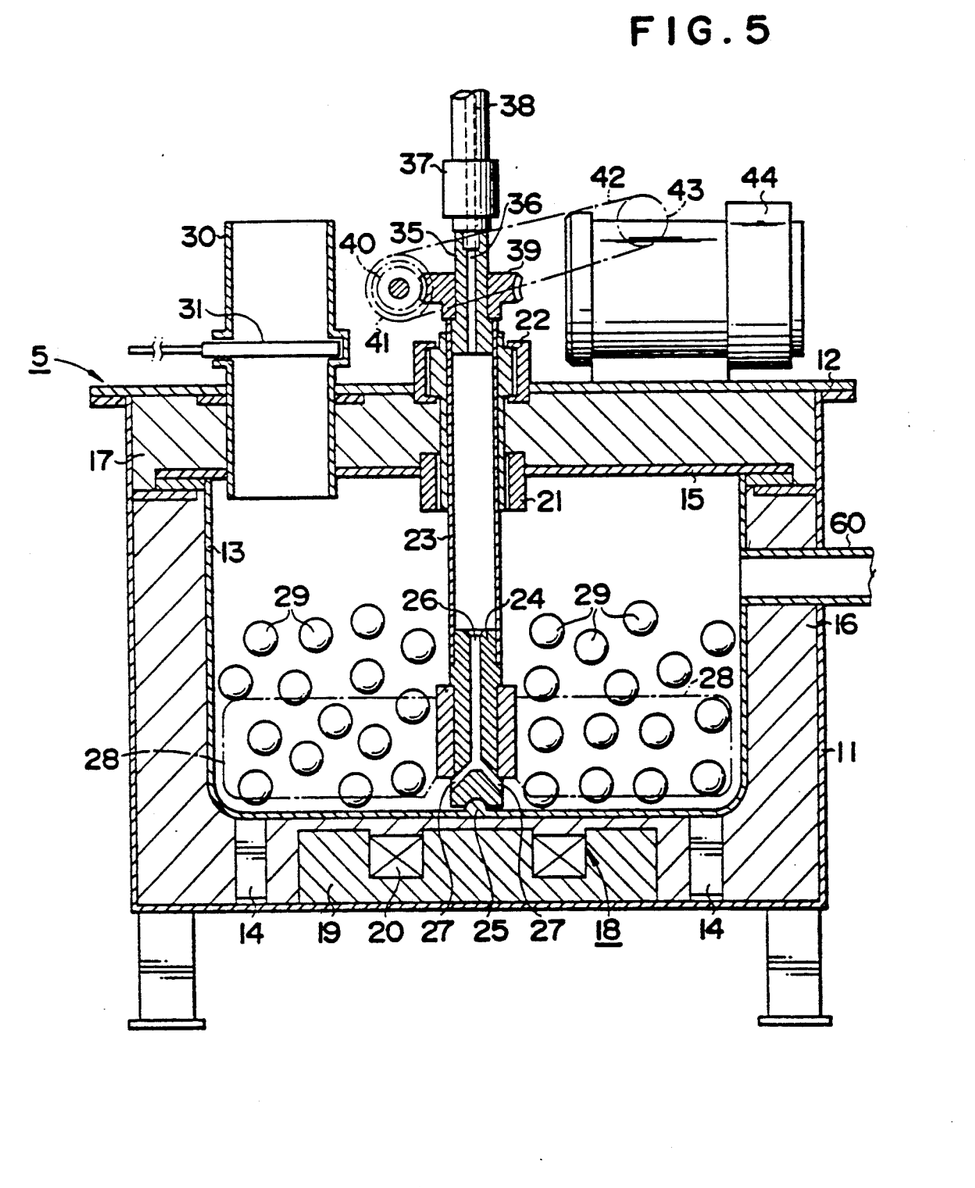
FIG. 5 is a vertical cross sectional view of a raw sewage drying apparatus according to the second embodiment of the present invention.

The drying apparatus 5 according to the second embodiment comprises the constituents substantially the same as those of the first embodiment excepting that instead of the magnetron 32 there is provided an induction heater 18. That is, the drying apparatus comprises the airtight first casing 13, the rotatable drive shaft unit 23 provided in the first casing 13, the stirring means 28 fixed to the drive shaft unit 23 and having a plurality of blades for stirring raw sewage stored in the first casing 13, a plurality of elements or balls 29 contained in the first casing 13, said elements 29 being heated by an induction flux generated in the alternating electromagnetic field, and a heating means 32 provided outside the first casing 13 for generating an induction flux toward the first casing 13. Hence, the same components as those of the first embodiment are designated by the same numerals and explanations thereof are omitted.

Figure 7:
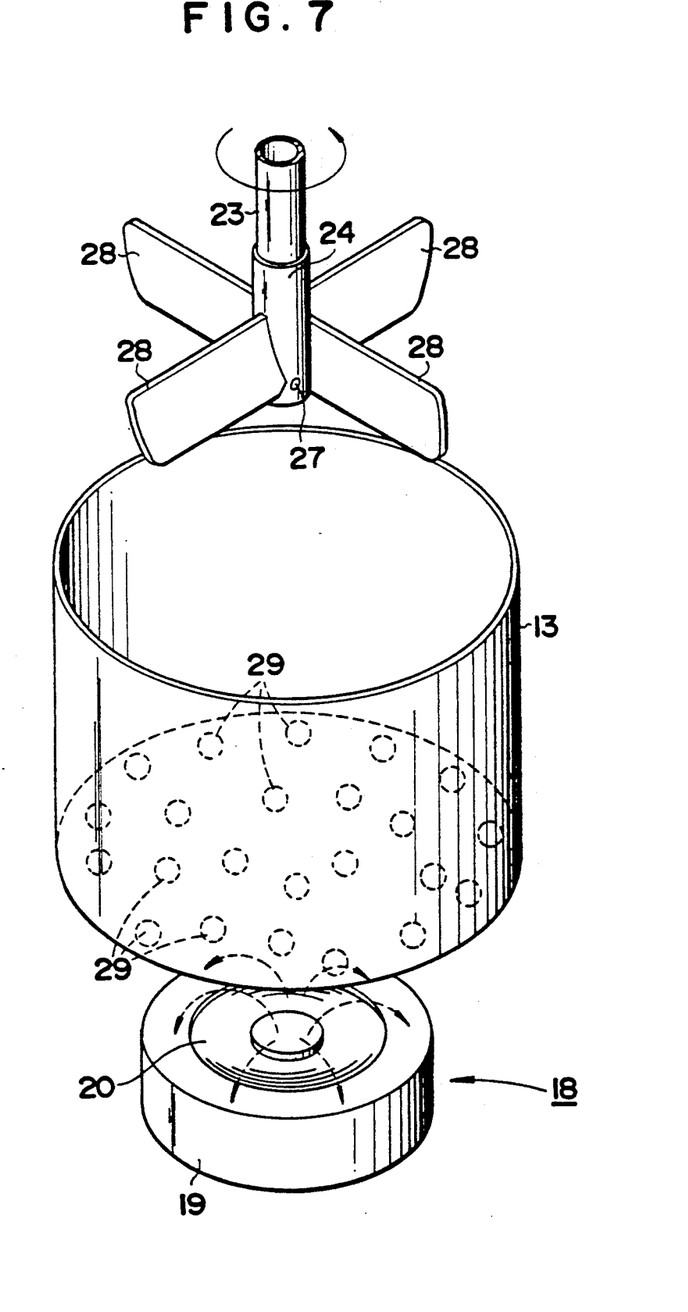
FIG. 7 is an exploded perspective view showing a relationship between the stirring blades, an inner casing and an induction heater, constituents of the drying apparatus, according to the second embodiment.

The induction heating 18 is fixed to the inner bottom of the outer casing 11 in the space defined between the inner bottom of the outer casing 11 and the lower surface of the inner casing 13. The induction heater 18 is composed of a core 19 having circular shape and coaxial with the outer casing 11 and a coil 29 accommodated in a groove defined as the coaxial shape. The plurality of elements 29 to be heated are made of conductive materials having relatively high resistance such as stainless steel, graphite, etc. contained in the inner casing 13.

Figure 6:
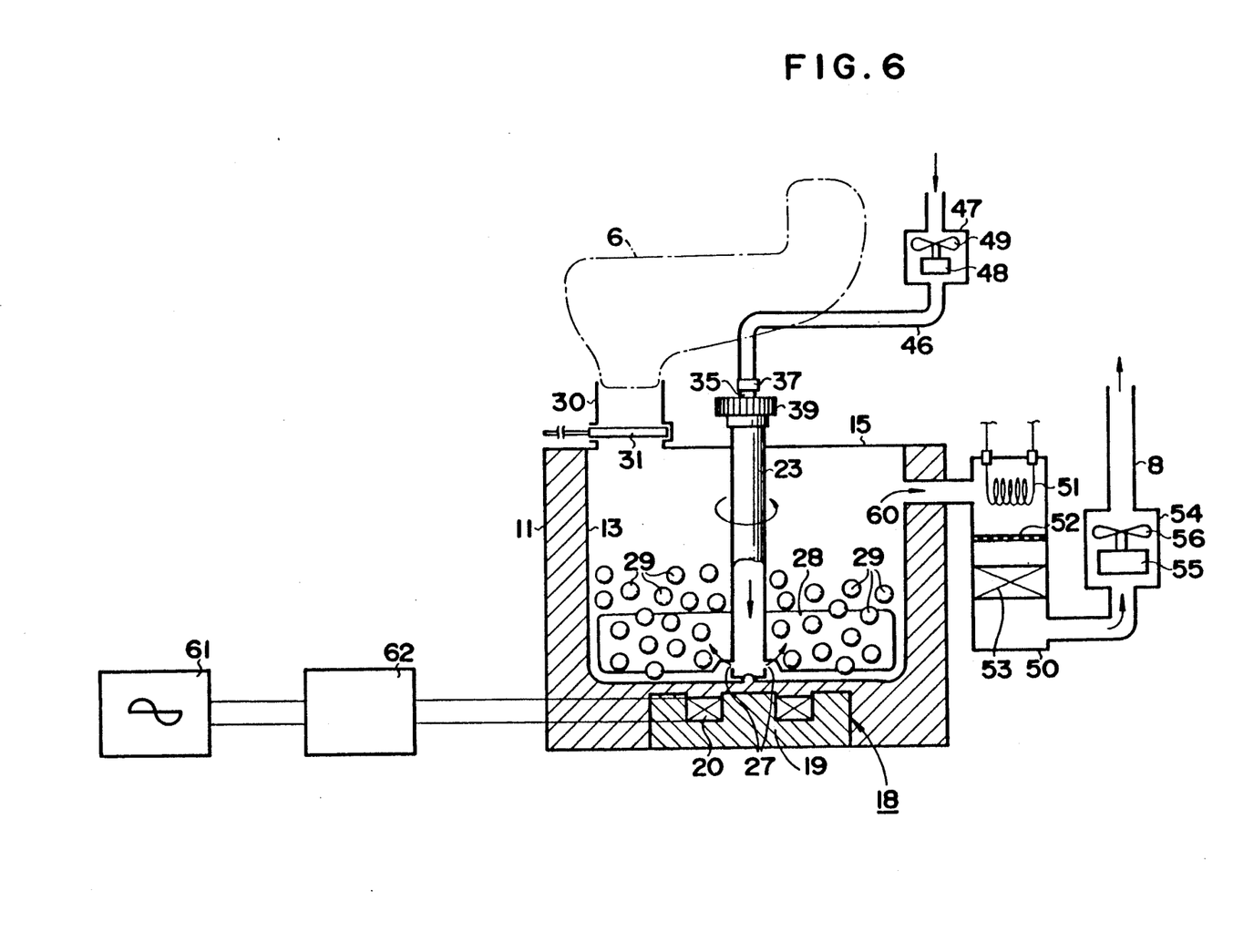
FIG. 6 is a view for explaining the connection between the raw sewage drying apparatus and peripheral apparatus according to the second embodiment.

A high frequency generator 62 is connected to a commercial power source 61. The high frequency generator 62 generates the high frequency ranging from 1 K Hz to 1 M Hz on the basis of the commercial power source 61 and the output of the high frequency generator 62 is connected to the coil 20.

The operation of the raw sewage drying apparatus according to the second embodiment is substantially the same as that of the first embodiment excepting the operation of the induction heater associated with the high frequency generator 61.

At the same time, when the power from a commercial power source 61 is supplied to a high frequency generator 62, the high frequency generator 62 increases the cycle of the frequency of the commercial power source to a high frequency of several K Hz to thereby generate the high frequency current. The high frequency current is supplied to the coil 20 which provides the alternating electric field. When the magnetic flux is generated in the coil 20, the direction of the magnetic flux is changed by the core 19 so that the magnetic flux is alternated at both poles of the coaxial shaped core 19 on the induction heater 18. The flow of the magnetic flux is illustrated in FIG. 7.

The alternating electromagnetic field formed by the high frequency passes the inner casing 13 which has a thin thickness but does not generate an overcurrent loss, and alternates in the inner casing 13. Since the elements 29 are made of materials of a relatively high resistance such as iron or stainless steel, an induction motive force is generated by passing the magnetic flux and overcurrent is generated so that the elements 29 per se generate the heat. Accordingly, the inner casing 13 is not heated or heated only a small amount, but the elements 29 are heated intensely so that the raw sewage contacting the elements 29 is heated by the heat of the elements 29.

According to a variation of the raw sewage drying apparatus of the second embodiment, when the elements 29 are of low resistance so that the alternating magnetic field passes the elements 29, no joule heat is generated in the elements 29, and hence only the inner casing is heated. Accordingly, the raw sewage in the inner casing 13 is heated by the heat generated at the bottom of the inner casing 13 whereby the liquid component thereof is evaporated. At this time, the elements 29 are rotated by the stirring blades 28 and crush the raw sewage to thereby expedite the transmittance of the heat to the raw sewage.

Although the invention has been described in its preferred form with a certain degree of particularity, it is to be understood that many variations and changes are possible in the invention without departing from the scope thereof.

The embodiments of the invention in which an exclusive property or privilege is claimed are defined as follows:

1. A raw sewage drying apparatus comprising:
a first air tight casing;
a rotatable drive shaft unit provided in the first casing;
a stirring means fixed to the drive shaft unit and having a plurality of blades for stirring raw sewage stored in the first casing;
a plurality of bodies contained in the first casing, said bodies being heated by a microwave; and
a heating means provided outside the first casing for radiating a microwave toward the first casing.

2. An apparatus according to claim 1, wherein said plurality of bodies to be heated are dielectrics made of ceramics.

3. An apparatus according to claim 1, wherein the heating means is a magnetron.

4. An apparatus according to claim 3, further comprising an antenna attached to the magnetron for radiating the microwave.

5. An apparatus according to claim 1, further comprising a second casing for housing the first casing and an insulating material interposed between the first and second casings.

6. An apparatus according to claim 5, wherein the first casing has an opening at an upper portion thereof and an inner cover for covering the opening, and the second casing has an opening at an upper portion thereof and an outer cover for covering the opening.

7. An apparatus according to claim 6, further comprising bearings fixed to a central portion of the outer cover and a central portion of the inner cover, the drive shaft unit comprising a hollow drive pipe rotatably mounted coaxially on the bearings and penetrating vertically inside the second casing and the first casing, a lower portion of the drive pipe being rotatably supported at the bottom of the first casing, the drive pipe having a vent passage extending axially thereof which defines a communication hole at the lower portion thereof for communicating with the inside space of the first casing, a drive mechanism connected to an upper portion of the drive shaft unit for effecting rotation thereof, and an introduction pipe vertically penetrating the outer cover and the inner cover for introducing raw sewage into the inside space of the first casing.

8. A raw sewage drying apparatus according to claim 7, further comprising a dust collector connected to an upper side portion of the first casing and having a filter for collecting dust and eliminating bad odor, and a diffusion pipe connected to the dust collector having a motor and a fan driven by the motor for discharging the dust and vaporized liquid material of the raw sewage from the first casing.

9. A raw sewage drying apparatus according to claim 7, further comprising a discharge duct provided at the upper side surface of the first casing by penetrating the first casing, said discharge duct communicating with the atmosphere via a diffusion pipe for discharging the dust and vaporized liquid material of the raw sewage from the first casing.

10. A raw sewage drying apparatus according to claim 9, further comprising a dust collector connected to the discharge duct and having therein a reheating electric heater at the upper portion thereof and a filter at the middle portion thereof and a catalyst made of platinum etc. fixed to the lower portion thereof.

11. A raw sewage drying apparatus according to claim 10, wherein the dust collector is connected to a blower composed of a motor and a fan driven by the motor and further connected to the diffusion pipe.

12. A raw sewage drying apparatus comprising:
a first air tight casing;

a rotatable drive shaft unit provided in the first casing;

a stirring means fixed to the drive shaft unit and having a plurality of blades for stirring raw sewage stored in the first casing;

a plurality of bodies contained in the first casing, said bodies being heated by an induction flux generated in an alternating electromagnetic field;

a heating means provided outside the first casing for generating the induction flux and radiating the same toward the first casing, the heating means being an induction heater including a core having a circular shape and coaxial with the first casing and a coil accommodated in a groove defined coaxially within the core; and a high frequency generator connected between a power source and the coil of the induction heater for generating high frequency from 1 KHz to 1 MHz on the basis of the power source.

13. An apparatus according to claim 12, wherein the bodies to be heated are of conductive materials.

14. An apparatus according to claim 13, wherein the conductive materials are stainless steel and graphite.

15. An apparatus according to claim 12, wherein the first casing has an opening at an upper portion thereof and an inner cover for covering the opening, the first casing is housed within a second casing, and the second casing has an opening at an upper portion thereof and an outer cover for covering the opening.

16. An apparatus according to claim 15, further comprising bearings fixed to a central portion of the outer cover and a central portion of the inner cover, the drive shaft unit comprising a hollow drive pipe rotatably mounted coaxially on the bearings and penetrating vertically inside the second casing and the first casing, a lower portion of the drive pipe being rotatably supported at the bottom of the first casing, the drive pipe having a vent passage extending axially thereof which defines a communication hole at the lower portion thereof for communicating with the inside space of the first casing, a drive mechanism connected to an upper portion of the drive shaft unit for effecting rotation thereof, and an introduction pipe vertically penetrating the outer cover and the inner cover for introducing raw sewage into the inside space of the first casing.

17. A raw sewage drying apparatus according to claim 16, further comprising a dust collector connected to an upper side portion of the first casing and having a filter for collecting dust and eliminating bad odor, and a diffusion pipe connected to the dust collector having a motor and a fan driven by the motor for discharging the dust and vaporized liquid material of the raw sewage from the first casing.

18. A raw sewage drying apparatus according to claim 16, further comprising a discharge duct provided at the upper side surface of the first casing by penetrating the first casing, said discharge duct communicating with the atmosphere via a diffusion pipe for discharging the dust and vaporized liquid material of the raw sewage from the inner casing.

19. A raw sewage drying apparatus according to claim 18, further comprising a dust collector connected to the discharge duct and having therein a reheating electric heater at the upper portion thereof and a filter at the middle portion thereof and a catalyst made of platinum etc. fixed to the lower portion thereof.

20. A raw sewage drying apparatus according to claim 19, wherein the dust collector is connector to a blower composed of a motor and a fan driven by the motor and further connected to the diffusion pipe.

* * * * *

UNITED STATES PATENT AND TRADEMARK OFFICE
CERTIFICATE OF CORRECTION

PATENT NO. : 5 152 074
DATED : October 6, 1992
INVENTOR(S) : Mitsuhiro Kishi It is certified that error appears in the above-identified patent and that said Letters Patent is hereby corrected as shown below:

Column 10, line 33; change "connector" to ---connected---.

Signed and Sealed this

Twenty-sixth Day of October, 1993

Attest:

BRUCE LEHMAN

*Attesting Officer*   *Commissioner of Patents and Trademarks*